United States Patent

[11] 3,624,620

[72] Inventor John R. Andrews
Framingham, Mass.
[21] Appl. No. 835,495
[22] Filed June 23, 1969
[45] Patented Nov. 30, 1971
[73] Assignee Honeywell, Inc.
Minneapolis, Minn.

[54] MEMORY ADDRESS SELECTION CIRCUITRY

14 Claims, 4 Drawing Figs.

[52] U.S. Cl. .......... 340/173 R, 340/174 TB, 307/289, 307/270
[51] Int. Cl. .......... G11c 7/00, G11c 5/02
[50] Field of Search .......... 340/173, 174; 307/270, 289

[56] References Cited

UNITED STATES PATENTS

| | | | |
|---|---|---|---|
| 3,436,738 | 4/1969 | Martin | 340/173 R |
| 3,177,373 | 4/1965 | Graham | 340/173 X |
| 3,176,144 | 3/1965 | Gunderson et al. | 340/174 X |
| 3,296,600 | 1/1967 | Einsele | 340/174 |
| 3,313,949 | 4/1967 | Nyberg | 340/174 X |

*Primary Examiner*—Stanley M. Urynowicz, Jr.
*Attorneys*—Fred Jacob and Ronald T. Reiling

ABSTRACT: In a memory system a selection circuit adapted to operate in a manner to avoid the multiple selection of memory address lines, thereby preventing the attendant destruction of data. The circuitry in the present invention includes first and second binary circuit means, both of which are adapted to respond to an input excitation signal, thereby producing output signals which are the complement of each other. These complementary signals, which are fed to address decoding means and thence to memory address lines, have noncoincident leading and trailing edges that prevent multiple address selection.

INVENTOR
JOHN R. ANDREWS

BY
David M. Driscoll
ATTORNEY

INVENTOR
JOHN R. ANDREWS

BY

David M. Driscoll
ATTORNEY

INVENTOR
JOHN R. ANDREWS
BY
David M. Driscoll
ATTORNEY

MEMORY ADDRESS SELECTION CIRCUITRY

BACKGROUND AND OBJECTS OF THE INVENTION

The present invention is related to electronic memory storage apparatus of the kind used in digital computers, and is more particularly concerned with improved address selection circuitry.

In present word-organized computers, each data word is stored in and retrieved from a separate address in memory. Where large amounts of data need to be stored, the memory system will require a great many addresses, each adapted to store a word composed of a plurality of binary digits or bits. In a solid-state electronic memory, for example, each row of memory elements or cells will have a particular address associated with it denoting separate physical locations. Each row of cells is adapted to store a work of data and each cell associated with the row is capable of storing a single bit of information. An address signal, usually in binary form, is decoded to select one address line coupling a single row of cells.

In a computer, the main storage memory usually has a fixed number of addresses which contain words of data. During normal computer operation, wherein a core memory is employed, requests for data from memory will occur. Such a request is in the form of a read-memory sequence wherein the contents of a predetermined address are sensed and transferred to the central processor elsewhere. Usually, the contents of only one address are transferred at a time. There should, therefore, be only one address selected during a memory read-write cycle. Just subsequent to an address change, it is important that both the prior and the new address are not selected when the new address is to be read from. This is usually accomplished by waiting until the new address is the only selected address thereby assuring that data retrieval will be accurate. Insofar as it is necessary for the new address to settle, such operation limits the speed of memory selection and thereby the operating speed of the computer.

Another problem associated with address selection, particularly in a solid-state memory system, is concerned with the destruction of data caused by the multiple selection of address lines. If a plurality of addresses is simultaneously selected during the address change interval, even for a relatively short time, significant sense current contributions may occur from corresponding memory cells of adjacent rows, which can cause an unintentional change in the data stored in those bit locations.

Existing techniques for preventing multiple address line selection call for the use of an inhibit strobe pulse during an address change interval to prevent the selection of any address line. This is a costly technique that requires the use of additional circuitry to produce inhibit pulses. Further, these inhibit pulses have to be synchronized with the occurrence of the address change. This introduces undesired additional delay in the inhibit pulse distribution circuitry.

It is the primary object of the present invention to provide new an improved apparatus which will overcome the foregoing problems.

It is a further object of the present invention to provide memory selection circuitry which will preclude multiple address selection.

It is another object of the invention to provide selection circuitry in an electronic memory system that will eliminate unwanted data destruction.

It is still another object of the present invention to provide low-cost memory selection circuitry which is simple in construction and reliable in operation.

SUMMARY OF THE INVENTION

These and other objects are satisfied in the present invention by providing a memory selection circuit that is adapted for use in an electronic memory system. The circuit is further arranged to connect between an address input line and a memory decoder circuit and to operate in a manner to prevent the selection of more than one memory address line at a time.

The selection circuit has an input terminal connected to one of the address input lines that is adapted to receive an input excitation signal having a leading and a trailing edge. The selection circuit further includes first and second binary circuit means both coupled to the input terminal of the selection circuit.

The first binary circuit means is adapted to respond to the leading edge of the input excitation signal and generate a first output signal having a leading edge that is delayed from the leading edge of the input excitation signal. The second binary circuit means is adapted to respond to the leading edge of the first output signal thereby generating a second output signal having a leading edge that is delayed from the leading edge of the first output signal. The second binary circuit means is further adapted to respond to the trailing edge of the input signal thereby generating a trailing edge of the second output signal that is delayed with respect to the trailing edge of the input signal. Further, the trailing edge of the first output signal is delayed with respect to the trailing edge of the second output signal. The first and second output signals are of opposite polarity, i.e. they are complementary signals.

The complementary signals which are fed to address decoding means prevent multiple address line selection. In actual operation the select levels of the complementary signals never occur at the same time. When changing from one address to another, therefore, multiple addressing does not occur. A situation does occur, however, wherein no address is selected. This may be referred to as a third (no-select) state, the first and second states being the previous and following addresses.

One advantage therefore of the present invention is realized by providing a selection circuit that generates complementary signals and that further inherently prevents multiple address selection. A further advantage is that the circuitry of the present invention is adapted for use with a memory system without the need for excess additional circuitry to prevent multiple selection. Hence, the absence of such additional circuitry results in a significant cost savings.

These advantages and others will become more apparent upon reading the accompanying detailed description in connection with the drawings in which:

FIG. 1*a* and 1*b* show, respectively, prior art selection circuitry and prior art decoder means.

FIGS. 1*c* through 1(*l*) show timing relationships associated with the circuitry of FIGS. 1*a* and 1*b*.

FIG. 2*a* is a preferred embodiment of the selection circuit of the present invention.

FIG. 2*b* shows the waveforms associated with the selection circuitry of the present invention.

FIG. 3 shows a memory system employing the selection circuit of the present invention.

DETAILED DESCRIPTION

Figure 1:
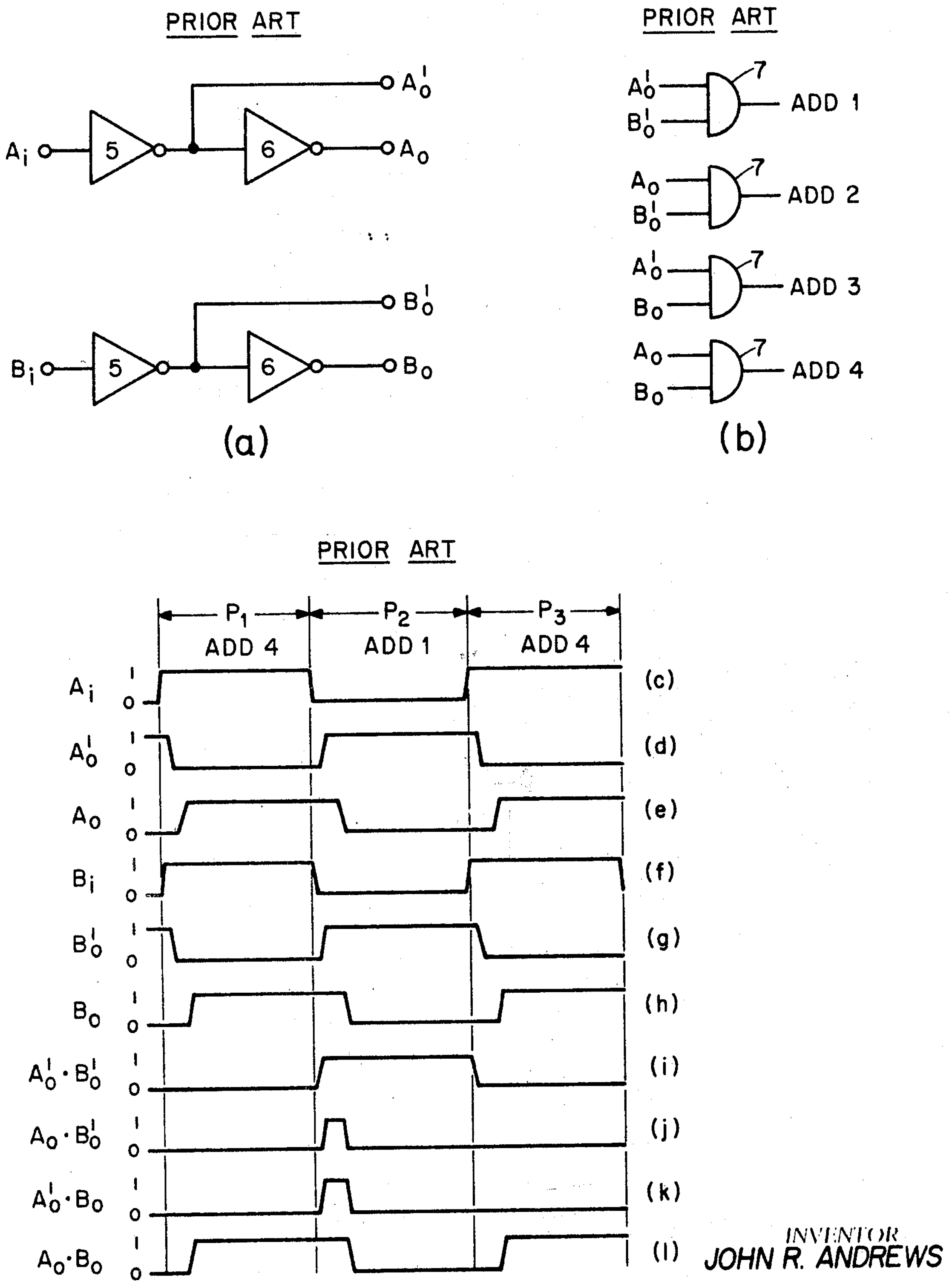
Figure 2A:
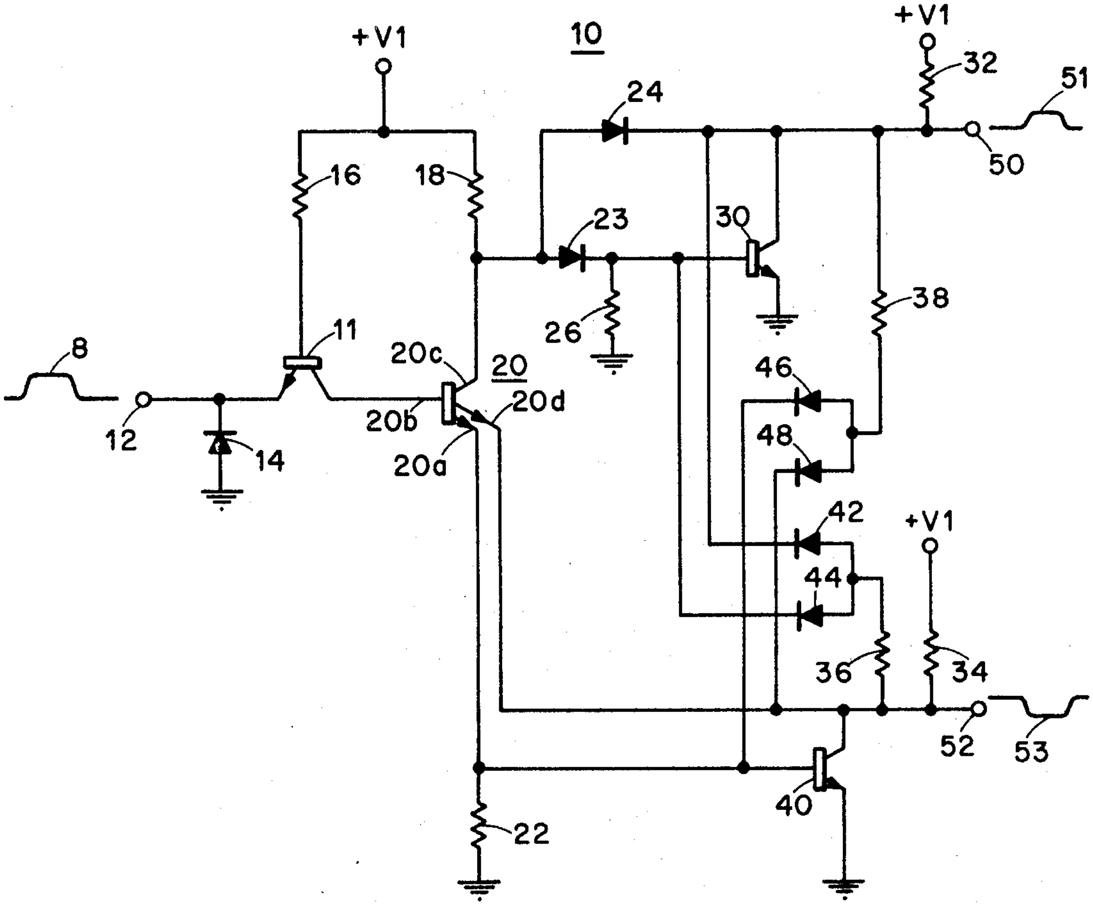
Figure 2B:
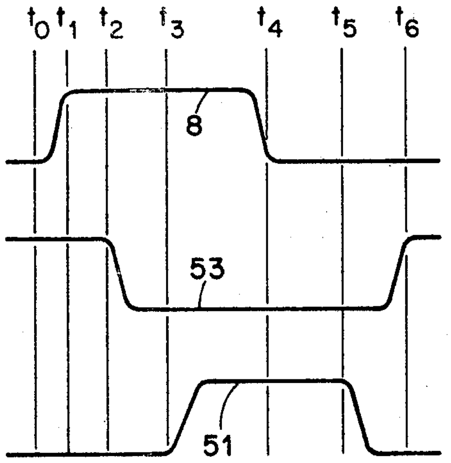
Figure 3:
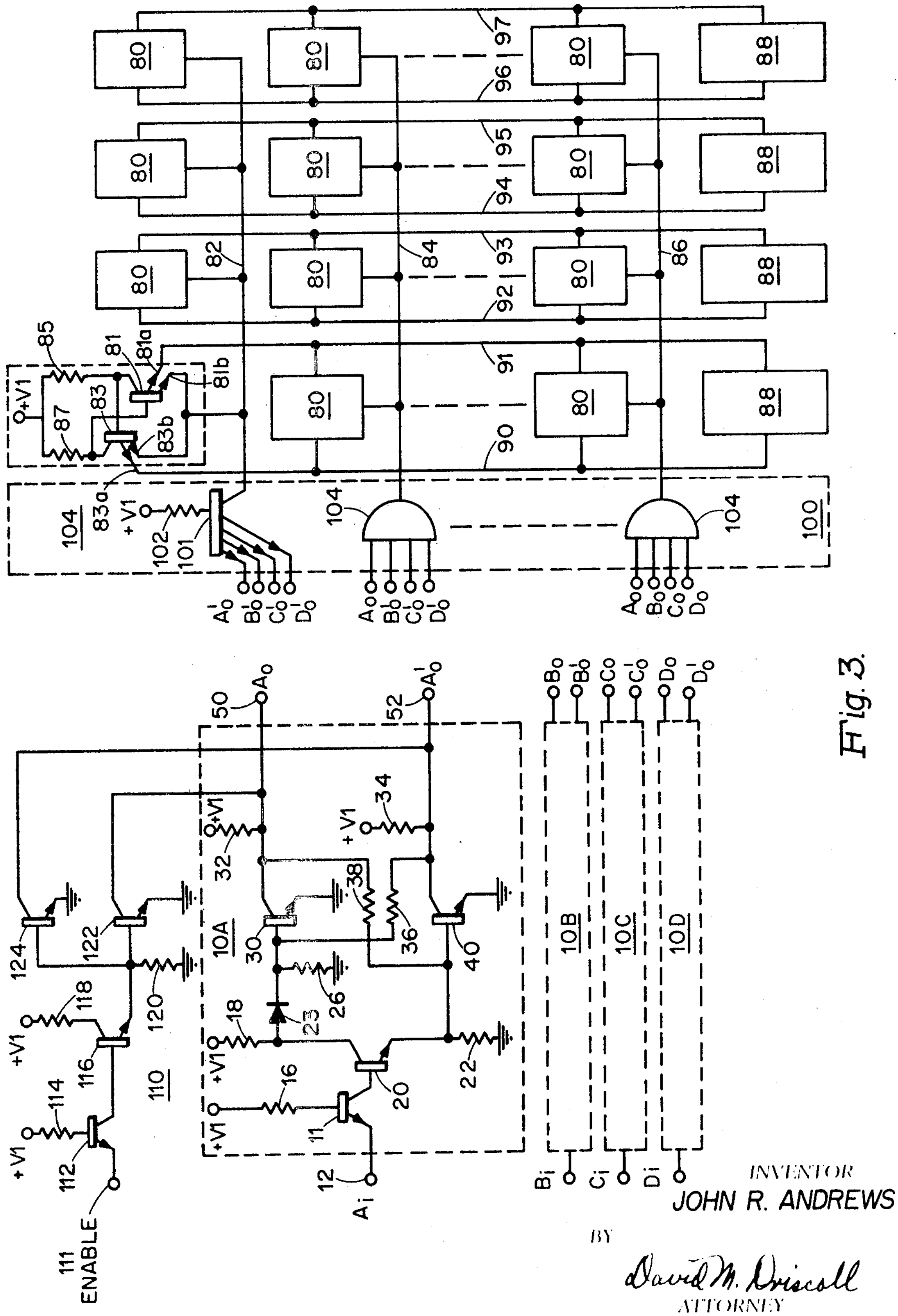

Before discussing the circuitry of the present invention as disclosed in FIGS. 2*a*, 2*b* and 3, it is advantageous to examine a prior art selection circuit and discuss some of the attendant disadvantages. One such circuit is depicted in FIG. 1*a*, and includes series-connected inverters 5 and 6. As with the selection circuit of the present invention, the circuits shown in FIG. 1*a* connect between input data lines and memory decoder circuits. Memory decoder circuitry, which includes decoder gates 7, are shown in FIG. 1*b* and various timing relationships are shown in FIGS. 1*c* through 1(*l*).

For convenience, only two input data signals are employed. These signals are shown in FIGS. 1*c* and 1*f*, for one particular address sequence, and are logically designated as input signals $A_i$ and $B_i$. Each selection circuit also has dual, complementary output signals, logically designated as $A_O$, $A_O'$, and $B_O$, $B_O'$. The following truth table indicates the binary inputs which are decoded into four unique addresses (ADD 1–ADD4) by the circuit of FIG. 1*b*:

| $A_i$ | $B_i$ |
|---|---|

| | | |
|---|---|---|
| ADD1 | | |
| | 0 | 0 |
| ADD2 | | |
| | 1 | 0 |
| ADD3 | | |
| | 0 | 1 |
| ADD4 | | |
| | 3 | 1 |

Referring in particular to the timing relationships of FIGS. 1*c* through 1(*l*), time periods $P_1$, $P_2$ and $P_3$ represent address intervals wherein a unique address is selected. For illustrative purposes, address 4 is selected during periods $P_1$ and $P_3$, while address 1 is selected during period $P_2$.

FIGS. 1*c*, 1*d* and 1*e* show, respectively, the logic waveforms $A_i$, $A_o'$ and $A_o$. It is important to note that both edges of the $A_o'$ waveform are delayed with respect to the $A_i$ waveform and that both edges of the $A_o$ waveform are delayed with respect to $A_o'$ waveform. FIGS. 1*f*, 1*g* and 1*h* show, respectively, the logic waveforms $B_i$, $B_o'$ and $B_o$. As with the A-waveforms, both edges of the $B_o'$ waveform are delayed with respect to the $B_i$ waveform and both edges of the $B_o$ waveform are delayed with respect to the $B_o'$ waveform.

FIGS. 1*i*, 1*j*, 1*k* and 1(*l*) show the four logic outputs from the decoder gates 7. These outputs tie to the address lines ADD1–ADD4 as shown in FIG. 1*b*. For the sequence of addresses shown only ADD1 or ADD4 should be selected (high). FIG. 1*i* shows the occurrence of a select level during period $P_2$ while FIG. 1(*l*) shows the occurrence of a select level during periods $P_1$ and $P_3$ (within this detailed description, the select level is the high (ONE) logic level.) However, in addition, the gates 7 having inputs $A_o$ and $B_o'$; $A_o'$ and $B_0$ also show a selected period, due to the overlapping of logic levels.

FIG. 2*a* discloses, respectively, a preferred embodiment of the selection circuit of the present invention adapted to prevent the occurrence of multiple address selection. FIG. 2*b* shows a timing diagram of input and output pulses for the circuit of FIG. 2*a*. Input signal 8 is shown in FIG. 2*a* as a positive pulse, applied to input terminal 12. The complementary output signals are shown as positive-going signal 51 generated as output terminal 50 and negative-going signal 53 generated as output terminal 52. Both signals 51 and 53 are delayed from input signal 8 (pulse 53 being longer in duration than pulse 51) as hereinafter explained.

Diode 14 is shown in FIG. 2*a* having its anode connected to ground and its cathode connected to the emitter electrode of transistor 11. The base electrode of transistor 11 is connected by way of resistor 16 to power source $+V_1$, i.e. the collector electrode of transistor 11 is coupled to the base electrode 20*b* of the transistor 20. The collector of transistor 20, which is referred to as collector electrode 20*c*, is connected via resistor 18 to power source $+V_1$. Transistor 20 further includes emitter electrodes 20*a* and 20*d* connected, respectively, to resistor 22 and the collector electrode of transistor 40. The other side of resistor 22 is connected to ground in the circuit of FIG. 2*a*. In a practical embodiment of the invention, a nominal value for resistor 18 would be 3 kilohms, for resistor 22 2 kilohms, and for resistor 16 4 kilohms.

Referring to the operation of transistors 11 and 20 only, when input signal 8 is at ground potential, herein termed a ZERO, transistor 11 is conducting, inhibiting the base drive of transistor 20 and holding it off (nonconducting). Diode 14 functions as a clamp to prevent excessive inductive ringing at input terminal 12. With transistor 20 off its collector electrode 20*c* is at the higher of its two possible values, i.e. emitter 20*a* is at essentially ground potential. When input signal 8 assumes its more positive level (+3 volts, for example) transistor 11 ceases base to emitter conduction and the current flowing in the forward-biased base to collector junction of transistor 11 turns transistor 20 on. The voltage at the emitters of transistor 20 increases and the voltage at the collector decreases.

The remaining circuitry connects from the emitter and collector electrodes of transistor 20. Diodes 23 and 24 have their anodes connected in common from collector electrode 20*c* of transistor 20 to the base and collector electrodes, respectively, of transistor 30. Diode pair 42, 44 is likewise connected with the anodes of diodes 42 and 44 in common, and with each cathode connected, respectively, to the collector and base electrodes of transistor 30. Resistor 36 connects between the anodes of diode 42 and 44 and the collector electrode of transistor 40. A third diode pair including diodes 46 and 48 connect with the anodes of diodes 46 and 48 in common, and with their cathodes connected, respectively, to the base and collector electrodes of transistor 40. Resistor 38 connects the common anodes of diodes 46 and 48 to the collector electrode of transistor 30. The emitter electrodes of both transistors 30 and 40 are coupled to ground. The resistors 32 and 34 connect, respectively, from the collector electrode of transistors 30 and 40 to power source $+V_1$. Outputs 50 and 52 are taken from the collector electrodes of transistors 30 and 40 respectively.

As previously mentioned, when input signal 8 is at ground potential transistor 20 is off. A current is flowing, however, in resistor 18 and diodes 23 and 24. This current is sufficient to turn transistor 30 on, driving the collector of transistor 30 to essentially ground potential. With transistor 20 nonconductive, transistor 40, whose base electrode is at essentially ground potential, is not turned on by transistor 20. Thus, whole transistor 30 conducts and diodes 46 and 48 are reverse-biased, transistor 40 cannot be rendered conductive by any conduction from diode pair 46, 48. Hence, the collector electrode of transistor 40 remains at approximately +3.5 volts. This particular voltage is determined primarily by the voltage of source $+V_1$ and the values of resistors 36 and 34. In summary, therefore, when input signal 8 is at ground potential, output terminal 50 is at essentially ground potential and output terminal 52 is at approximately +3.5 volts. These initial levels are shown in FIG. 2*b* at time $t_0$. Each diode pair of FIG. 2*a* has one of the common diodes shown, with its cathode connected to the collector electrode of either transistor 30 or transistor 40. These diodes (24, 42 and 48) function as antisaturation components by preventing the complete saturation of their associated transistor when it conducts. For instance when transistor 20 is off and its collector electrode 20*c* is at the higher of its two possible voltage values, as previously mentioned, conduction occurs through diodes 23 and 24. It is diode 24 that keeps transistor 30 from saturating, due to its limiting forward voltage drop. Similarly, emitter 20*d* is coupled to the collector electrode of transistor 40 and is adapted to prevent transistor 40 from saturating when transistor 20 conducts.

Let us next assume that the input excitation signal shifts to its most positive valve or a voltage of about +3 volts. This is shown in FIG. 2*b* as occurring at approximately time $t_1$. The positive-going signal blocks the base to emitter current of transistor 11 and allows a base to collector current to flow via resistor 16 to the base of transistor 20, turning transistor 20 on. Emitter 20*a* of transistor 20 goes positive rather rapidly and turns transistor 40 on. The collector electrode of transistor 40, which is coupled to output terminal 52, therefore, approaches essentially ground potential at time $t_2$ (FIG. 2*b*). The collector electrode 20*c* of transistor 20 has a relatively small voltage swing. However, when transistor 20 conducts the collector 20*c* of transistor 20 goes slightly negative from its previous value. When transistor 40 conducts and its collector electrode goes toward ground from a previous value of approximately +3.5 volts, at a voltage of approximately +2.8 volts conduction ceases through diodes 42 and 44 and transistor 30 is allowed to turn off. The 2.8 volt level is determined primarily by the value of resistors 26 and 36. The turning off of transistor 30 is indicated in FIG. 2*b* at time $t_3$, wherein waveform 51 assumes its most positive value indicating that transistor 30 is off. This positive value is approximately +3.5 volts and is determined by the value of resistors 32 and 38.

During the operation of the circuitry of FIG. 2*a*, let it be further assumed that at time $t_4$, shown in FIG. 2*b*, excitation pulse 8 reverts back to the level it was at time $t_0$, shown as essentially ground potential. In FIG. 2*b* the time interval between times $t_1$ and $t_4$, is shown as an arbitrary value. This time interval can be defined as an address interval, during which only one memory address is selected. If pulse 8 were programmed to remain at its positive level for more than one address interval the trailing edges of pulses 8, 51 and 53 would be shifted to the right in time relationship.

The reversion of pulse 8, to ground potential causes the following events to occur. Transistor 11 conducts and the current flowing in resistor 16, which had previously flown into the base electrode of transistor 20, now is conducted by transistor 11. Simultaneously with the cutoff of transistor 20, the collector voltage of transistor 20 increases and the voltage on emitter 20*a* goes toward ground. Transistor 40 does not instantaneously turn off, however, because current flowing in diodes 46, 48 and resistor 38 from the collector electrode of transistor 30, keeps transistor 40 on. The increased collector voltage of transistor 20, coupled via diode 23, initially turns on transistor 30. The collector voltage of transistor 30 which was at +3.5 volts then goes negative toward ground. This is shown in FIG. 2*b* at time $t_5$ of output pulse 51(terminal 50). When the collector voltage of transistor 30 reaches approximately +2.8 volts conduction ceases through diodes 46 and 48 and transistor 40 is allowed to turn off. Its collector voltage, therefore, increases positively toward +3.5 volts. This action is shown in FIG. 2*b* as occurring at time $t_6$ of pulse 53 (terminal 52). Note that both pulses 51 and 53 are not positive, or in what could be termed their selection state, at the same time. This prevents multiple address selection, as explained in further detail below.

In FIG. 3 a memory system employing the principles of the present invention is disclosed. The memory system generally includes selection circuits 10A, 10B, 10C and 10D, decoder 100, enable circuit 110, address and data lines, memory cells (elements) 80 and digit/sense circuits 88.

FIG. 3 shows another embodiment of the selection circuit. While the selection circuit of FIG. 3 is somewhat different in structure than the circuit of FIG. 2*a* like components are designated by like reference numerals. The operation of the selection circuit of FIG. 3 will be generally explained, as it is substantially identical to that of FIG. 2*b*.

When input terminal 12 is at ground potential, transistors 20 and 40 are not conducting whereas transistor 30 is conducting. Output terminal 50 is at ground and output terminal 52 is at its positive (ONE) level. When input terminal 12 assumes its positive level transistor 20 conducts and, in sequence, transistor 40 conducts and transistor 30 turns off. Referring to FIG. 2*b* again transistor 40 turns on at time $t_2$ and transistor 30 ceases conduction at time $t_3$. Thereafter, when input terminal 12 reverts to ground potential, transistor 20 turns off. In sequence, transistor 30 conducts (time $t_5$) and transistor 40 turns off (time $t_6$). The outputs at terminals 50 and 52 are respectively, similar to the waveforms 51 and 53 shown in FIG. 2*b*. The four selection circuits shown in FIG. 3 each have separate input terminals 12 having waveforms impressed thereon which are logically designated as $A_i$, $B_i$, $C_i$ and $D_i$. Each selection circuit 10 also has dual, complementary output terminals 50, 52 having waveforms generated therefrom which are logically designated as $A_0$, $A_0'$; $B_0$, $B_0'$; $C_0$, $C_0'$; and $D_0$, $D_0'$.

Enable circuit 110 connects between an enable input terminal 111 and output terminals 50, 52 of selection circuit 10A and is adapted to prevent any address line from being selected unless an enabling signal is present at terminal 111. For the embodiment of FIG. 3, a ground potential on input terminal 111 is defined as an ENABLE level. This potential, when coupled to the emitter electrode of transistor 112, holds transistor 112 on. The base electrode of transistor 112 is coupled via resistor 114 to the power source $+V_1$. The collector electrode of transistor 112 is coupled to the base electrode of transistor 116, whereas the collector electrode of transistor 116 ties to power source $+V_1$, via resistor 118. The emitter electrode of transistor 116 is coupled to the base electrodes of transistors 122 and 124 and in addition is connected by way of resistor 120 to ground. The emitter electrodes of transistors 122 and 124 tie to ground, whereas the collector electrode tie, respectively, to output terminals 50 and 52.

In operation, when a ground (ENABLE) signal is applied to enable input terminal 111 transistor 112 is conducting current through resistor 114 from power source $+V_1$. With no base current drive available for transistor 116, it is held off. No current flows in resistor 118 or resistor 120 and transistors 122 and 124, likewise remain nonconducting. Thus, output terminals 50 and 52 are free to assume predetermined complementary levels. When it is desired to completely inhibit addressing, the signal applied to input terminal 111 goes positive. The base to emitter current of transistor 112 ceases and a base to collector current flows instead, which causes conduction of transistor 116. The collector current of transistor 116 flows from power source $+V_1$ through resistor 118. The current flowing in the emitter of transistor 116 causes conduction of transistors 122 and 124. The collectors of these two output transistors go to essentially ground potential, clamping the output terminals 50 and 52 of selection circuit 10A to ground and preventing any decoding by gates 104 and any selection of a memory address line. With both $A_0$ and $A_0'$ held at ground no decoding gate 104 is selected.

Decoder 100 includes a plurality of decoder gates 104 and is adapted to decode from four address bits (and their complements) to 16 address lines (only three such address lines are shown). The four address bits are the logical output waveforms from the selection circuits and are designated $A_0$, $B_0$, $C_0$ and $D_0$. Their complements are designated $A_0'$, $B_0'$, $C_0'$ and $D_0'$. One decoder gate 104 is shown in detail as including multiemitter transistor 101 and resistor 102. The multiemitter transistor 101 shown in FIG. 3 has four emitters, each one being connected to receive an address waveform ($A_0'$, $B_0'$, $C_0'$, $D_0'$). The remaining 15 gates 104 receive inputs from all other possible binary combinations. Resistor 102 is coupled between the base of transistor 101 and power source $+V_1$. The collector of transistor 101 is actually the output of decoder gate 104. The 16 collectors in effect form the outputs of decoder 100 that tie to the memory address lines, designated as address lines 82, 84 and 86 in FIG. 3. When all inputs to a gate 104 are positive, transistor 101 turns off and the address line associated with that decoding gate 104 is selected. Selection is effected in the embodiment of FIG. 3 when no current flows in the selected address line. This allows data to be written into and retrieved from the row of cells associated with the selected address line.

The memory storage circuitry itself is considered as including storage cells 80, data lines 90 through 97, address lines which actually number 16 (shown as address lines 82, 84 and 86) and digit sense circuitry 88. The first cell (bit) of each address has a data line pair 90, 91 connected thereto. The remaining cells of each address have data line pairs 92, 93; 94, 95; and 96, 97 connected thereto. Each data line pair also connects to a digit/sense circuit 88 which functions to allow data to be written into the cell associated with both the data line pair and the selected address, and also functions to allow data retrieval therefrom. The circuitry of the memory cell 80 is shown in detail for one memory cell. Patent application Ser. No. 517,218; now U.S. Pat. No. 3,487,367 assigned to the assignee of the instant invention, shows storage cells and in addition discloses digit/sense circuitry usable in the embodiment of FIG. 3.

Referring to the memory cell shown in detail in FIG. 3, two multiemitter transistors 81, 83 are shown each having respective collector resistors 85, 87 and respective emitter electrodes 81*a*, 81*b*; 83*a*, 83*b*. The emitters 81*b* and 83*b* tie to address line 82 while the base and collector electrodes of transistors 81 and 83 connect in cross-coupled fashion.

As previously mentioned, address line selection is effected when no current flows in the particular address line. During this occurrence, if transistor 83 had been previously conducting and transistor 81 previously nonconducting, current flows in data line 90, via emitter 83*a* when address line 82 is selected. This current is sensed to determine the state of that particular memory element.

If, in addition, adjacent cells contribute sense current to sense line 90, due to erroneous multiple addressing, the voltage of sense line 90 increases and at a particular level this positive voltage will cause the memory cell shown in detail in FIG. 3 to change state. The collector electrode of transistor 83 goes sufficiently positive to turn transistor 81 on, thereby turning transistor 83 off. It is also possible for this data destruction to occur to other cells associated with data line pair 90, 91. The selection circuitry of FIG. 3, however, prevents this multiple selection of address lines from occurring and thereby prevents the attendant destruction of data in the following manner.

Referring to FIG. 2*b* again, and assuming that the high level is the select level, at no time are waveforms 51 and 53 both at their high (select) level. Even if pulse 8 again reverted to its high level, pulse 53 would go low prior to pulse 51 going high. Similarly, all other waveforms that connect to decoder 100 (FIG. 3) display delayed leading and trailing edges as shown in FIG. 2*b*. In essence, therefore, when the decoder 100 has waveforms impressed thereon, during an address change their effectively exists a third (no address) state wherein no addressing occurs. The short selection periods shown in FIG. 1*j* and 1*k* no longer occur.

Thus, from the foregoing it becomes apparent that the objects of the invention as set forth above, are attained. The selection circuit prevents multiple selection of memory address lines. In particular, it does this inherently and without the use of complex additional circuitry. Further by employing the selection circuit of the present invention improved memory speed is attainable without the use of additional inhibiting means.

Having now described the present invention with reference to certain illustrative embodiments, it should be understood that certain modifications can be made in the apparatus described which lie well within the scope of the present invention. For example, the voltage values and polarities may differ from those stated with reference to FIGS. 2*a* and 3. Further, the select level need not be the high, positive voltage level shown, but could equally well be the negative, low level. Similarly, the invention is not limited to a specific memory cell but may operate with a number of well-known circuits.

I claim:

1. A selection circuit adapted to provide complementary output signals having noncoincident leading and trailing edges, said selection circuit comprising:

a. an input terminal;

b. a first transistor having base, emitter and collector electrodes, said emitter electrode coupled to said input terminal and said base electrode coupled to a reference source;

c. a second transistor having a base electrode, a collector electrode and at least one emitter electrode said base electrode of said second transistor coupled to a collector electrode of said first transistor, the collector electrode of said second transistor being coupled to said reference source and one emitter of said second transistor being resistively coupled to ground;

d. a third transistor having base, emitter and collector electrodes, said base electrode of said third transistor connected to said one emitter of said second transistor, said emitter electrode of said third transistor being coupled to ground;

e. a fourth transistor having base, emitter and collector electrodes, said base electrode of said fourth transistor being coupled to the collector electrode of said second transistor and the emitter electrode of said fourth transistor being coupled directly to ground;

f. first and second output terminals, said first output terminal being coupled to the collector electrode of said third transistor and said second output terminal being coupled to the collector electrode of said fourth transistor;

g. first resistive means connected between the collector electrode of said third transistor and the base electrode of said fourth transistor; and h. second resistive means connected between the collector electrode of said fourth transistor and the base electrode of said third transistor, said selection circuit being adapted to provide complementary output signals at said first and second output terminals.

2. A selection circuit adapted to provide complementary output signals having noncoincident leading and trailing edges, said selection circuit comprising:

a. an input terminal;

b. a first transistor having base, emitter and collector electrodes, said emitter electrode coupled to said input terminal and said base electrode coupled to a reference source;

c. a second transistor having a base electrode, a collector electrode and at least two emitter electrodes, said base electrode of said second transistor coupled to a collector electrode of said first transistor, the collector electrode of said second transistor being coupled to said reference source and a first emitter of said second transistor being resistively coupled to ground;

d. a third transistor having base, emitter and collector electrodes, said base electrode of said third transistor connected to a second emitter of said second transistor, said emitter electrode of said third transistor being coupled to ground;

e. a fourth transistor having base, emitter and collector electrodes, said base electrode of said fourth transistor being coupled to the collector electrode of said second transistor and the emitter electrode of said fourth transistor being coupled directly to ground;

f. first and second output terminals, said first output terminal being coupled to the collector electrode of said third transistor and said second output terminal being coupled to the collector electrode of said fourth transistor;

g. first resistive means connected between the collector electrode of said third transistor and the base electrode of said fourth transistor; and h. second resistive means connected between the collector electrode of said fourth transistor and the base electrode of said third transistor, said selection circuit being adapted to provide complementary output signals at said first and second output terminals.

3. A circuit comprising: input means for receiving an input signal indicative of a binary value;

first binary circuit means coupled to said input means and providing a first output signal;

second binary circuit means coupled to said input means and providing a second output signal;

said first binary circuit means responsive to a first transition between indicated binary values of the input signal for generating a transition of the first output signal to a first binary value;

said second binary circuit means responsive to a second transition between binary values of the input signal for generating a transition of the second output signal to the first binary value;

said second binary circuit means coupled to said first binary circuit means responsive to the transition to the first binary value of the first output signal for generating a transition of the second output signal to a second binary value; and said first binary circuit means coupled to said second binary circuit means responsive to the transition to the first binary value of the second output signal for generating a transition of the first output signal to the second binary value.

4. A system comprising:

a plurality of input means each for receiving a respective input signal indicative of a binary value;

a plurality of first binary circuit means each coupled to a respective one of said input means and each for providing a first output signal;

a plurality of second binary circuit means each coupled to a respective one of said input means and each for providing a second input signal;

each of said first binary circuit means responsive to a first transition between indicated binary values of the respective signal for generating a transition of the respective output signal to a first binary value;

each of said second binary circuit means responsive to a second transition between indicated binary values of the respective input signals for generating a transition of the respective second output signal to the first binary value;

each of said second binary circuit means coupled to the respective one of said first binary circuit means coupled to the same respective input means and responsive to the transition to the first binary value of the respective first output signal for generating a transition of the respective output signal to a second binary value;

each of said first binary circuit means coupled to the respective one of said second binary circuit means coupled to the same respective input means and responsive to the transition to the first binary value of the respective output signal for generating a transition of the respective first output signal to the second binary value; and decoder means responsive to a plurality of the first and second output signals for providing a decoder signal indicative of the composite binary value of the input signals.

5. A decoding device for receiving a plurality of input binary signals and for delivering a selection signal at a respective one of a plurality of output leads which corresponds to the aggregate binary pattern of all of said input signals, wherein each of said input signals operates selectively in each of two states and effects a first transition in transferring from a first of said states to the second state and a second transition in transferring from said second state to said first state, comprising:

a plurality of selection circuits, each of said selection circuits being coupled to receive a respective one of said input signals and to deliver first and second binary output signals representing complementary information;

each of said selection circuits comprising first and second circuit elements for respectively generating said first and second output signals;

said first circuit element coupled to said second circuit element and responsive to the first transition of the corresponding input signal to generate a first transition in said first output signal a predetermined time after the occurrence of said input signal first transition and being responsive to a second transition in said second output signal to generate a second transition in said first output signal a predetermined time after the occurrence of said second output signal second transition;

said second circuit element coupled to said first circuit element and responsive to the first transition of said first output signal to generate a first transition in said second output signal a predetermined time after the occurrence of said first output signal first transition and being responsive to the second transition of the corresponding input signal to generate a second transition in said second output signal a predetermined time after the occurrence of said input signal second transition; and decoder means responsive to a plurality of said output signals for generating a selection signal on one of said output leads in accordance with the pattern of said output signals from said plurality of selection circuits.

6. In an electronic memory system, an address selection circuit comprising:

a. an input circuit means for receiving an excitation input signal having a select level and a nonselect level;

b. first binary circuit means coupled to said input circuit means and responsive to a first transition from the nonselect level to the select level of the excitation input signal for generating a leading edge of a first output signal;

c. first delay means coupled to said first binary circuit means and to said input circuit means for delaying the leading edge of the first output signal relative to the first transition of the excitation input signal;

d. second binary circuit means coupled to said input circuit means and said first binary circuit means and responsive to the leading edge of the first output signal for generating a leading edge of a second output signal;

e. second delay means coupled to said second binary circuit means and to said first binary circuit means for delaying the leading edge of the second output signal relative to the leading edge of the first output signal;

f. third binary circuit means coupled to said input circuit means and responsive to a second transition from the select level to the nonselect level of the excitation input signal for generating a trailing edge of the second output signal;

g. third delay means coupled to said third binary circuit means and to said input circuit means for delaying the trailing edge of the second output signal relative to the second transition from the select level to the nonselect level of the excitation input signal;

h. fourth binary circuit means coupled to said second binary circuit means and responsive to the trailing edge of the second output signal for generating a trailing edge of a first output signal; and i. fourth delay means coupled to said fourth binary circuit means and to said second binary circuit means for delaying the trailing edge of the first output signal relative to the trailing edge of the second output signal.

7. A selection circuit as recited in claim 6 wherein said input circuit means includes an input terminal, a first transistor having an emitter coupled to said input terminal, means for applying a potential to a base of said first transistor, a second transistor having a base coupled to a collector of said first transistor and said second transistor coupled to said first, second, third and fourth binary circuit means.

8. A selection circuit as defined in claim 6 wherein said input circuit means includes first and second output terminals, said first binary circuit means includes a third transistor, said third transistor having an input terminal coupled to said first output terminal of said input circuit means, said second binary circuit means includes a fourth transistor, said forth transistor having an input terminal coupled to said second output terminal of said input circuit means, said selection circuit includes complementary output terminals and said third and fourth transistors coupled to said complementary output terminals.

9. A selection circuit as defined in claim 8 wherein said third and fourth transistors each have a base, emitter and collector electrode, each of said base electrodes coupled to one of said output terminals of said input circuit means said selection circuit further including first and second resistive means, said first resistive means coupled between the collector electrode of said third transistor and the base electrode of said fourth transistor, said second resistive means coupled between the collector electrode of said fourth transistor and the base electrode of said third transistor.

10. A selection circuit as defined in claim 9 and further including means connected to said third and fourth transistors for preventing saturation of said last-recited transistors.

11. An electronic memory system comprising:

A. a plurality of address input means for receiving a binary input signal having a leading and trailing edge;

B. a plurality of selection circuits, coupled one each to one each of said address input lines, each selection circuit further comprising, a. first binary circuit means responsive to the leading edge of the binary input signal for generating a leading edge of a first output binary signal, b. first delay means coupled to said first binary circuit means for delaying the leading edge of the first output binary signal relative to the leading edge of the binary input signal, c. second binary circuit means responsive to the leading edge of the first output binary signal for generating a leading edge of a second signal, binary signal, d. second delay means coupled to said second binary circuit means for delaying the leading edge of the second output binary signal relative to the leading edge of the first output binary signal, e. third binary circuit means responsive to the trailing edge of the input signal for generating a trailing edge of the second output binary signal, f. third delay means coupled to said third binary circuit means for delaying the trailing edge of the second output binary signal relative to the trailing edge of the input signal, g. fourth binary circuit means responsive to the trailing edge of the second output binary signal for generating a trailing edge of the first output binary signal, h. fourth delay means coupled to said fourth binary circuit means for delaying the trailing edge of the first output signal relative to the trailing edge of the second output signal;

C. decoder means having a plurality of input and output terminals selectively coupled to said plurality of selection circuits for receiving the first and second output signals; and D. memory storage circuit means having a plurality of address lines coupled to said decoder means for selecting a designated address, whereby said selection circuit prevents the concurrent selection of more than one address line.

12. An electronic memory system as defined in claim 11 wherein said decoder means comprises a plurality of decoder circuits, each decoder circuit including a transistor having a plurality of emitters each coupled to one of said input terminals of said decoder means and a collector coupled to one of said output terminals of said decoder means.

13. An electronic memory system as recited in claim 11 wherein said first, second, third and fourth binary circuit means comprise semiconductor active elements.

14. An electronic memory system as recited in claim 13 wherein said first, second, third and fourth delay means comprise semiconductive elements.

* * * * *